Oct. 11, 1949.　　　　J. C. ZIERS　　　　2,484,664

POWER CUTOFF SWITCH

Filed Nov. 15, 1948

INVENTOR,
John C. Ziers.
BY Roy E. Hamilton,
Attorney.

Patented Oct. 11, 1949

2,484,664

UNITED STATES PATENT OFFICE 2,484,664

POWER CUTOFF SWITCH

John C. Ziers, Independence, Mo.

Application November 15, 1948, Serial No. 60,101

8 Claims. (Cl. 200—52)

1

This invention relates to new and useful improvements in power cut-off switches, and has particular reference to cut-off switches of the rotation responsive type.

In many types of machine processes wherein a plurality of machines or machine elements are operated by a single motor, it is necessary that each machine or machine element continue to operate properly in order that the remainder of the machines or machine elements function properly. This is particularly true where successive operations are performed on an object or material being processed by the separate machines, whereby if any one machine should for any reason fail, continued operation of the remainder of the machines would cause a jam or pile-up of the material being processed. An example of this situation occurs in a conveyor system having a plurality of stages or sections, wherein stoppage of any one stage would cause a pile-up of the material being conveyed. The same situation of course obtains whether the various machines or machine elements are driven by a single motor or by separate motors.

The principal object of the present invention is, therefore, the provision of a rotation responsive electrical switch adapted to be affixed to a normally rotating portion of one machine or machine element of a plurality of said machines or elements, and operable whenever the rotation of said machine creases or falls below a predetermined rate to stop the motor or motors driving all of said machines or machine elements.

Another object is the provision of a power cut-off switch of the class described comprising a hollow housing adapted to be affixed to a normally rotating portion of a machine and to rotate therewith, a vane pivotally suspended in said housing, a quantity of liquid carried in said housing and adapted to move said vane when said housing is rotated, and an electrical switch carried by said vane and operable by the movement thereof.

Other objects are simplicity and economy, dependability of operation, durability, and adaptability for use in a wide variety of applications.

With these objects in view, as well as other objects which will appear in the course of the specification, reference will be had to the drawing, wherein—

Figure 1 is a schematic diagram of a machine system including a power cut-off switch embodying the present invention.

2

Figure 1:
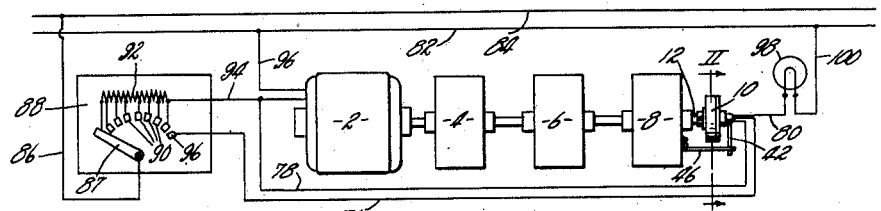

Like reference numerals apply to similar parts throughout the several views, and the numeral 2 applies to an electric motor, and the numerals 4, 6 and 8 to machines, or machine elements, connected in tandem and driven by said motor. A power cut-off switch 10 embodying the present invention is attached to a shaft 12 or other rotating portion of machine 8, said machine being the farthest removed from motor 2 whereby operation thereof depends on the continued operation of machines 4 and 6.

Figure 2:
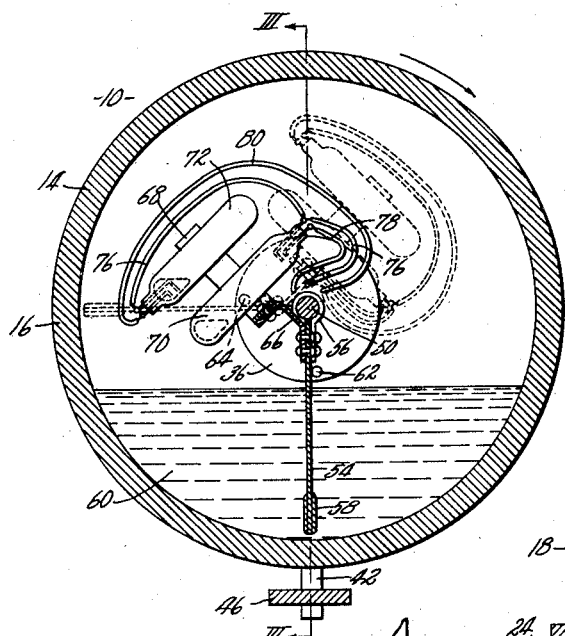
Fig. 2 is an enlarged sectional view taken on line II—II of Fig. 1, showing the switch parts in the rest position in solid lines, and in the position assumed while rotating in dotted lines, with parts left in elevation.
Figure 4:
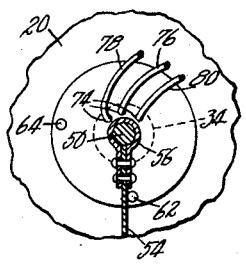
Fig. 4 is a fragmentary section taken on line IV—IV of Fig. 3.
Figure 3:
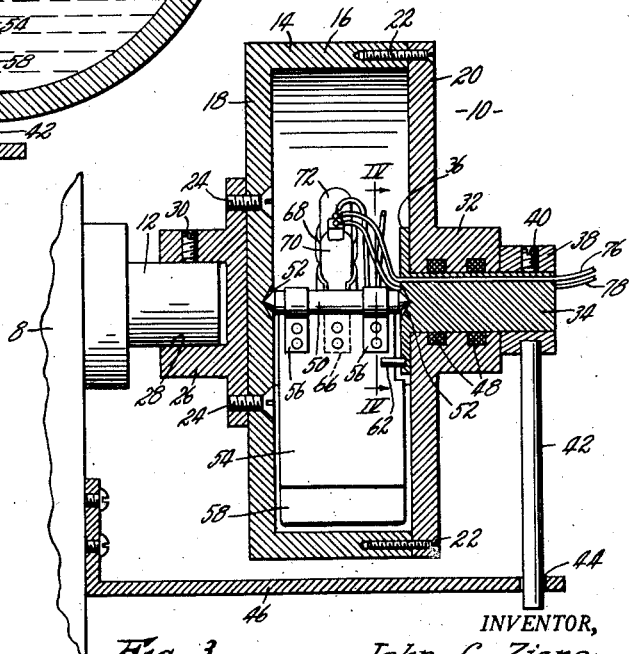
Fig. 3 is a fragmentary sectional view taken on line III—III of Fig. 2, with parts left in elevation.

Cut-off switch 10, shown in detail in Figs. 2, 3 and 4, includes a flat cylindrical housing 14 which may be made of plastic, metal, or other suitable material, and which comprises peripheral wall 16, an integral end wall 18, and an opposite end wall 20 releasably secured to said peripheral wall by screws 22. Secured to the outer surface of end wall 18 by screws 24 is a flanged member 26, said flanged member having formed therein an outwardly opening socket 28 disposed concentrically with said housing, said socket being adapted to receive the end portion of shaft 12. A set screw 30 secures member 28 rigidly on shaft 12, whereby housing 14 is caused to rotate with said shaft, in the direction indicated by the arrow in Fig. 2.

End wall 20 is provided with a central, outwardly extending boss 32 which is centrally bored to receive a spindle 34 for rotation, said spindle being coaxial with shaft 12. At its inner end, said spindle is provided with a flange 36 adapted to lie against the inner surface of end wall 20. A collar 38 is fixed on the outwardly extended end portion of said spindle by means of set screw 40. A rod 42 fixed to collar 38 and extending radially therefrom, projects at its outer end through a hole 44 in a bar 46 fixed rigidly to some stationary member such as the frame of machine 8. Bar 46 and rod 42 thus secure spindle 34 against rotation as housing 14 rotates thereabout. Boss 32 is provided with oil seal rings 48 adapted to prevent leakage of oil from housing 14 about spindle 34.

A shaft 50 is disposed axially in housing 14 concentrically with spindle 34 and shaft 12, the ends of said shaft being conically pointed and journaled respectively in conical recesses 52 formed in the inner surface of end wall 18 and the inner end of spindle 34. A planar vane 54 lying in the plane of shaft 50 is secured at its inner edge to said shaft by brackets 56 and extends radially outwardly therefrom to a point adjacent the peripheral housing wall 16. Lead slugs 58 or other suitable weights may be attached to the outer end of said vane. Said vane normally hangs vertically downwardly from shaft 50, and is partially immersed in a quantity of oil 60 or other suitable non-conducting liquid carried within housing 14. When housing 14 is rotated by machine 8 as indicated by the arrow in Fig. 2, oil 60 will be urged against vane 54 by its frictional contact with the housing walls, thus pivoting said vane upwardly as shown in dotted lines. Stop pins 62 and 64 fixed in flange 36 of spindle 34 and projecting inwardly therefrom serve to limit the pivotal movement of the vane.

Fixed to vane 54 adjacent shaft 50 is a bracket 66 to which is fixed a spring clip 68 which carries two electrical switches 70 and 72. Said switches are of a standard type each comprising an elongated glass tube having a pair of spaced apart electrodes sealed in one end thereof and a quantity of mercury carried therein. When said tube is tilted in one direction said mercury connects said electrodes to close the switch, and when the tube is tilted in the opposite direction the mercury runs to the opposite end of the tube to open said switch. It will be noted in Fig. 2 that when vane 54 is hanging downwardly against stop pin 62, the switches are so tilted that switch 70 is open and switch 72 closed, while when the vane is pivoted by oil 60 to the position shown in dotted lines, switch 70 will be closed and switch 72 open. The electrical lead wires for said switches enter housing 14 through snugly fitting holes 74 formed through spindle 34, and include a common wire 76 connected with one terminal of each switch, and wires 78 and 80 connected respectively with the other terminals of switches 70 and 72. There is sufficient slack in said lead wires to permit free pivotal movement of vane 54.

Referring to Fig. 1 for a representative wiring diagram, it will be seen that current is supplied to motor 2 from line wires 82 and 84. Current flowing from wire 84 through wire 86 passes to a movable arm 87 of a standard motor starting box 88. Said arm is adapted to pass sequentially over a plurality of contacts 90 to which are connected taps from a resistance 92. Said resistance is connected by wire 94 with motor 2, and the return wire 96 from said motor is connected to line wire 82. Wire 76 is connected to a contact 96 on starting box 88 and adapted to be contacted by arm 87, wire 78 is connected with a lamp 98 or other signal device. The return wire 100 of said lamp is connected to line wire 82.

The operation of the device is substantially as follows. With motor 2 shut off, the internal parts of cut-off switch 10 are positioned as shown in solid lines in Fig. 2, with switch 70 open and switch 72 closed. Arm 87 is then moved to the right as viewed in Fig. 1, and current flows from wire 84, wire 86, arm 87, resistance 92, wire 94, motor 2, and wire 96, thus completing the starting motor circuit. As arm 87 is moved to the right, resistance 92 is gradually removed from the circuit, and motor 2 picks up speed. When a predetermined speed has been reached, oil 60 in rotating housing 14 will pivot vane 54 upwardly to the position shown in dotted lines in Fig. 2, thus closing switch 70 and opening switch 72. When arm 87 makes contact at 90, the motor current will flow through wire 86, arm 87, contact 96, wire 76, switch 70, wires 78 and 90, motor 2, and wire 96. Then should any one of machines 4, 6 or 8 cease to operate for any reason, housing 14 will cease to rotate, and vane 54 will be pivoted downwardly by gravity. This opens switch 70, thus breaking the motor circuit. At the same time, switch 72 is closed, and current flowing through wire 76 flows through switch 72, wire 80, lamp 98, and wire 100 to light lamp 98, thus giving a signal indicating that motor 2 has been shut down. Motor 2 would also be shut down if any of machines 4, 6 or 8 should not cease operation completely, but should fall below a predetermined low speed, since housing 14 must be rotated at a certain speed to maintain vane 54 in its elevated position. The speed of rotation of housing 14 required to operate the enclosed switches depends on various factors such as the viscosity of oil 60, the size and configuration of vane 54, and the mass of weights 58, and may thereby be readily adapted to operate at any desired speed.

While machines 4, 6 and 8 are shown connected in tandem so that a single power cut-off switch 10 mounted on the outermost machine suffices to shut off motor 2 in case any one of the machines should fail, it is apparent that if each machine had a separate driving connection with motor 2, a cut-off switch 10 could be attached to a rotating portion of each machine, each of said switches being adapted to shut the motor down if its associated machine should fail. Likewise, if each of machines 4, 6 and 8 should be operated by a separate motor, the cut-off switch associated with each machine could be adapted to shut down all of the motors.

While a specific embodiment of my invention has been shown, many minor changes of construction and operation could be made without departing from the spirit of the invention.

What I claim is:

1. A switch comprising a rotatable housing, a member oscillatably supported within said housing coaxially with the axis of rotation of said housing and adapted normally to hang downwardly, a quantity of liquid carried in said housing and adapted to be moved by the rotation of said housing to oscillate said oscillatable member, and an electrical switch carried by said rotatable member and operated by said oscillatable member.

2. A switch comprising a rotatable cylindrical housing, a radial vane supported for oscillation in said housing coaxially with the axis of rotation of said housing, a quantity of liquid carried in the lower portion of said housing and normally immersing the outer portion of said vane, whereby as said housing rotates said liquid will be moved by said housing to impinge against and oscillate said vane, and an electrical switch carried by said vane and operable by the oscillation of said vane.

3. A switch comprising a cylindrical housing rotatable about a substantially horizontal axis, a shaft disposed axially in said housing for axial oscillation, a radially extending vane carried by said shaft, a quantity of liquid carried in the lower portion of said housing and normally immersing a portion of said vane, whereby said vane is oscillated by said liquid as said housing rotates, and an electrical switch carried by said vane and operable by the oscillation of said vane.

4. A switch comprising a cylindrical housing rotatable about a substantially horizontal axis, a shaft disposed axially in said housing for axial oscillation, a radially extending vane carried by said shaft, weights secured to the outer end portion of said vane, a quantity of liquid carried in the lower portion of said housing and normally immersing a portion of said vane, whereby said vane is oscillated by said liquid as said housing rotates, and an electrical switch carried by said vane and operable by the oscillation of said vane.

5. A switch comprising a rotatable cylindrical housing, a radial vane supported for oscillation in said housing coaxially with the axis of rotation of said housing, a quantity of liquid carried in the lower portion of said housing and normally immersing the outer portion of said vane, whereby as said housing rotates said liquid will be moved thereby to impinge against and oscillate said vane, means for limiting the oscillatory movement of said vane, and an electrical switch carried by said vane and operable by the oscillation of said vane.

6. A switch comprising a rotatable cylindrical housing, a radial vane supported for oscillation in said housing coaxially with the axis of rotation of said housing, a quantity of liquid carried in the lower portion of said housing and normally immersing the outer portion of said vane, whereby as said housing rotates said liquid will be moved thereby to impinge against and oscillate said vane, a spindle extending axially into said housing, means securing said spindle against rotation, stop members carried by said spindle for limiting the oscillatory movement of said vane, and an electrical switch carried by said vane and operable by the oscillation of said vane.

7. A switch comprising a rotatable cylindrical housing, a radial vane supported for oscillation in said housing coaxially with the axis of rotation of said housing, a quantity of liquid carried in the lower portion of said housing and normally immersing the outer portion of said vane, whereby as said housing rotates said liquid will be moved thereby to impinge against and oscillate said vane, a spindle extending axially into said housing, means securing said spindle against rotation, stop members carried by said spindle for limiting the oscillatory movement of said vane, and a plurality of electrical switches carried by said vane and operable by the oscillation of said vane, the lead wires for said switches entering said housing through holes formed longitudinally through said fixed spindle.

8. A switch comprising a rotatable cylindrical housing, a radial vane supported for oscillation in said housing coaxially with the axis of rotation of said housing, a quantity of liquid carried in the lower portion of said housing and normally immersing the outer portion of said vane, said vane being adapted to hang downwardly by gravity and to be oscillated upwardly by the force of said liquid as said housing rotates, means for limiting the oscillatory movement of said vane, and a plurality of electrical switches carried by said vane and operable by the oscillation of said vane, said switches being so disposed that certain of them will be closed when said vane hangs downwardly, and certain other of said switches will be closed when said vane is oscillated upwardly.

JOHN C. ZIERS.

REFERENCES CITED

The following references are of record in the file of this patent:

UNITED STATES PATENTS

| Number | Name | Date |
|---|---|---|
| 1,410,308 | Holt | Mar. 21, 1922 |
| 1,482,167 | Varley | Jan. 29, 1924 |
| 1,677,008 | Townsend | July 10, 1928 |
| 1,903,989 | Fink et al. | Apr. 18, 1933 |